United States Patent [19]
Kai et al.

[11] Patent Number: 5,256,174
[45] Date of Patent: Oct. 26, 1993

[54] GAS SEPARATOR SYSTEM

[75] Inventors: Norichika Kai; Shozo Kaneko; Tsugiya Abe, all of Nagasaki, Japan

[73] Assignee: Mitsubishi Jukogyo Kabushiki Kaisha, Tokyo, Japan

[21] Appl. No.: 923,586

[22] Filed: Aug. 3, 1992

[30] Foreign Application Priority Data

Aug. 1, 1991 [JP] Japan .................. 3-192979
Sep. 12, 1991 [JP] Japan .................. 3-232757

[51] Int. Cl.$^5$ ............................................. B01D 53/04
[52] U.S. Cl. ........................................ 96/116; 96/124; 96/130
[58] Field of Search ............... 55/25, 26, 58, 62, 68, 55/75, 161-163, 179, 389

[56] References Cited

U.S. PATENT DOCUMENTS

| | | | |
|---|---|---|---|
| 2,237,684 | 4/1941 | Moore | 55/162 X |
| 3,016,978 | 1/1962 | Hull | 55/161 X |
| 3,155,471 | 11/1964 | Schymik et al. | 55/162 |
| 3,448,561 | 6/1969 | Seibert et al. | 55/163 X |
| 3,513,631 | 5/1970 | Seibert et al. | 55/179 X |
| 4,127,395 | 11/1978 | McKey et al. | 55/163 X |
| 4,162,146 | 7/1979 | Seibert | 55/163 |
| 4,209,308 | 6/1980 | Blodgett | 55/179 |
| 4,211,291 | 7/1980 | Kellner | 175/17 |
| 4,272,265 | 6/1981 | Snyder | 55/161 X |
| 4,469,494 | 9/1984 | van Weenen | 55/179 |
| 4,698,075 | 10/1987 | Dechene | 55/163 |
| 4,787,417 | 11/1988 | Windsor, Jr. | 55/179 X |
| 4,870,960 | 10/1989 | Hradek | 128/202.22 |
| 4,925,464 | 5/1990 | Rabenau et al. | 55/162 X |
| 4,968,334 | 11/1990 | Hilton | 55/162 X |
| 4,989,641 | 2/1991 | Jones et al. | 137/625.11 |
| 5,112,367 | 5/1992 | Hill | 55/26 |
| 5,114,441 | 5/1992 | Kanner et al. | 55/26 |

FOREIGN PATENT DOCUMENTS

| | | |
|---|---|---|
| 0250235 | 12/1987 | European Pat. Off. ...... 55/25 |
| 61-147121 | 9/1986 | Japan . |
| 63-31251 | 6/1988 | Japan . |
| 64-41732 | 2/1989 | Japan . |
| 481350 | 4/1938 | United Kingdom . |
| 1168102 | 10/1969 | United Kingdom . |

Primary Examiner—Robert Spitzer
Attorney, Agent, or Firm—Wenderoth, Lind & Ponack

[57] ABSTRACT

A pressure-swing adsorption type gas separator system includes two adsorption vessels and a switching valve for placing each of the adsorption vessels alternately in communication with a raw gas source and an exhaust gas line so that a pressurized adsorption process and a reduced-pressure desorption process are sequentially carried out in each of the vessels. The switching valve is a four-port rotary valve having four ports connected to the adsorption vessels, a raw gas source and an exhaust gas line and is driven by a rotary drive. Preferably, the rotary drive is a drive motor for a pressurizing pump provided in a raw gas line, and the four-port rotary valve is connected to the drive motor via a speed reducer.

4 Claims, 6 Drawing Sheets

GAS SEPARATOR SYSTEM

BACKGROUND OF THE INVENTION

1. Field of the Invention

The present invention relates to a pressure-swing adsorption type gas separator system which is suitable for carrying out a process of separating, for instance, oxygen gas and nitrogen gas from air.

2. Description of the Prior Art

Figure 10:
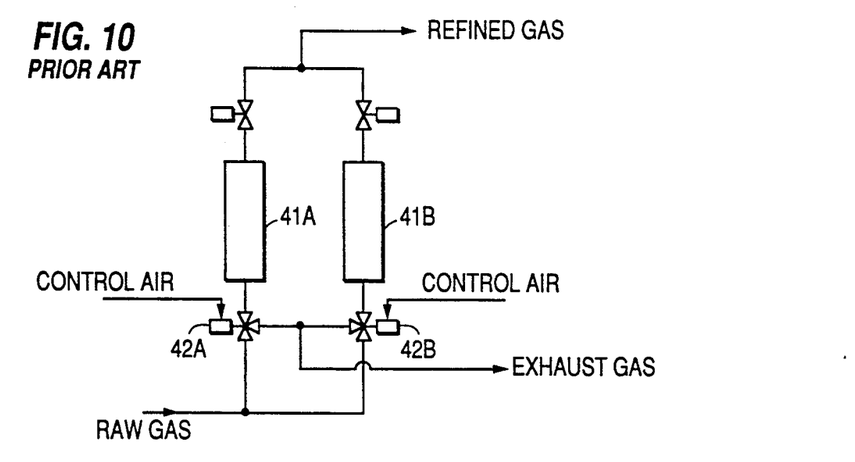
FIG. 10 is a system diagram of a gas separator system in the prior art.

One example of a pressure-swing adsorption type gas separator system in the prior art is schematically shown in FIG. 10. In this system, raw gas is intermittently fed to a plurality of adsorption vessels 41A and 41B each accommodating adsorbent. Refined gas thus passes from the adsorption vessels 41A and 41B. While the above-mentioned feeding of the raw gas is interrupted, the gas adsorbed by the adsorbent is desorbed from the adsorbent and exhausted. In this gas separator system, the directions of flows of gases are switched at a high frequency by switching valves 42A and 42B consisting of electromagnetic valves, pneumatically operable valves or the like.

Figure 11:
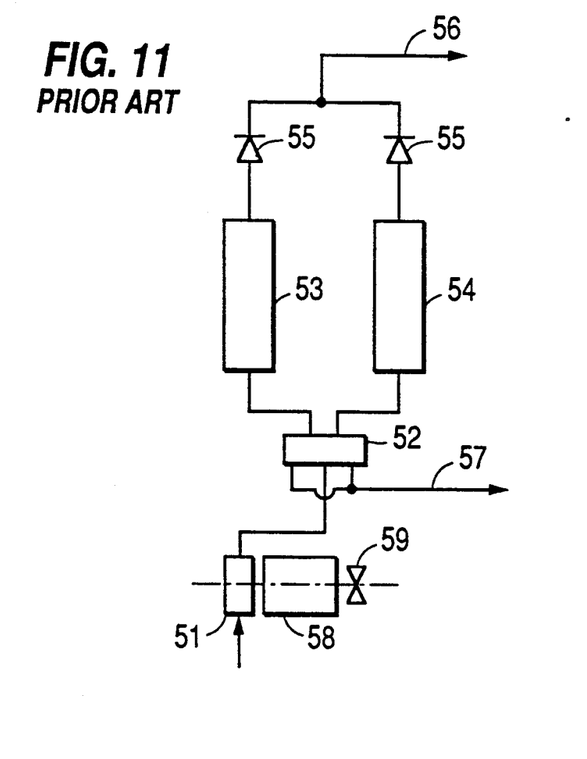
FIG. 11 is a system diagram of another pressure-swing type air separator system in the prior art.

Another example of a pressure-swing adsorption type gas separator system in the prior art, which was designed to separate air into its components, is schematically shown in FIG. 11. In this system, air to be processed is pressurized by an air pump 51. The air is then selectively introduced into an adsorption tower 53 or 54 (adsorption process) by means of a five-port electromagnetic valve 52. Thus, nitrogen in the air is adsorbed by nitrogen adsorbent within one adsorption tower, and concentrated oxygen gas 56 is collected via a check valve 55. On the other hand, the other adsorption tower 54 or 53 is placed in communication with an exhaust gas system 57, held at atmospheric pressure, via the five-port electromagnetic valve 52, and nitrogen adsorbed within the adsorption tower 54 or 53 is desorbed under a reduced pressure and is exhausted through the exhaust gas system 57 (reduced-pressure desorption-reproduction process). The switching between the pressurized adsorption process and the reduced-pressure desorption-reproduction process is effected by driving the five-port electromagnetic valve 52 by feeding an electric current to an electromagnetic coil. It is to be noted that the air pump 51 is driven by a motor 58, and this motor 58 is associated with a cooling fan 59.

However, the above-described gas separator systems in the prior art employ an electromagnetic valve having a large bore diameter necessary to allow for a high flow rate of the raw gas. This valve generates a large electromagnetic force. Alternatively, if a pneumatically operable valve is employed, the system is complex and control air (or pressure) becomes necessary. Furthermore, the above-mentioned electromagnetic valves cannot be expected to have a long life because they are required to operate at a high frequency.

Moreover, in the gas separator system shown in FIG. 11, the five-port electromagnetic valve, provided on the feed side of the adsorption towers, is controlled by a sequencer, a timer, a microcomputer or the like to switch over at predetermined time period. However, in this system, if a voltage should vary during operation, the output of the air pump would vary regardless of whether an A.C. motor or a D.C. motor is used. For instance, if the voltage should lower, the outlet pressure of the air pump would lower and the air fed to an adsorption tower would be reduced. The pressure in the adsorption tower could not be raised back up to a predetermined pressure within a fixed time, and the oxygen concentration of the product gas would be lowered.

SUMMARY OF THE INVENTION

A principal object of the present invention is to provide a pressure-swing adsorption type gas separator system which is free from the above-described problems associated with the heretofore known gas separator system, which does not require an electromagnetic valve exerting a large electromagnetic force, and which has a long life even though carrying out a switching operation at a high frequency.

A more specific object of the present invention is to provide a pressure-swing adsorption type gas separator system in which the switching between adsorption and regeneration is effected without making use of a sequencer, a timer or a microcomputer. Accordingly, a regeneration process can be carried out after the pressure in an adsorption tower has risen to a predetermined pressure, whereby the concentration of product gas can be prevented from decreasing.

According to the present invention, the pressure-swing adsorption type gas separator system is provided with two adsorption vessels and a switching valve for selectively placing each of the adsorption vessels in communication with a raw gas source and an exhaust gas line, the switching valve comprising a four-port rotary valve having four connection ports connected to the two adsorption vessels, the raw gas source and the exhaust gas side and driven by a rotary drive.

Further, the four-port rotary valve is connected to the rotary drive via an intermittent rotary transmission device.

The intermittent rotary transmission system may be a gear type of intermittent rotary transmission comprising Geneva gears.

In addition, the rotary drive for the four-port rotary valve may be the motor which drives a pressurizing pump provided in the raw gas line. In this case, the four-port rotary valve is connected to the drive motor via a speed reducer.

The speed reducer may comprise speed reduction gears.

As described above, according to the present invention, a raw gas source is connected to one adsorption vessel and the other adsorption vessel is connected to the exhaust gas line and these connections are alternated successively by the four-port rotary valve rotationally driven by the rotary drive. When the raw gas source is connected to one adsorption vessel via the four-port rotary valve, raw gas is introduced into the adsorption vessel where a component of the gas is adsorbed by adsorbent. While the other adsorption vessel is connected to the exhaust gas line, the gas component adsorbed by the adsorbent is desorbed and exhausted to the exhaust gas line and the adsorbent is regenerated.

Since the switching valve is of a rotary type driven by a rotary drive as described above, the valve can have a large bore diameter, has a long life, and does not require air for its positioning.

In addition, because the four-port rotary valve is connected to a motor of a pressurizing pump via a speed reducer, the amount of raw gas fed by the pressurizing pump can be made proportional to an angle over which the four-port rotary valve is driven. If a speed reduction ratio of the speed reducer is appropriately preset, the four-port rotary valve can be switched when a predetermined amount of raw gas has been fed. Accordingly, the four-port rotary valve can be switched in accordance with the amount of raw gas fed to an adsorption tower regardless of the rotational speed of a pressurizing pump, i.e. even if the speed varies due to a variation in the voltage impressed on the pump motor. Accordingly, the pressure at the end of the adsorption process will always be a predetermined value, and so a reduction in the concentration of collected gas is obviated.

The abovementioned and other objects, features and advantages of the present invention will become more apparent by referring to the following description of preferred embodiments of the present invention made in conjunction with the accompanying drawings.

DETAILED DESCRIPTION OF THE PREFERRED EMBODIMENTS

Figure 1A:
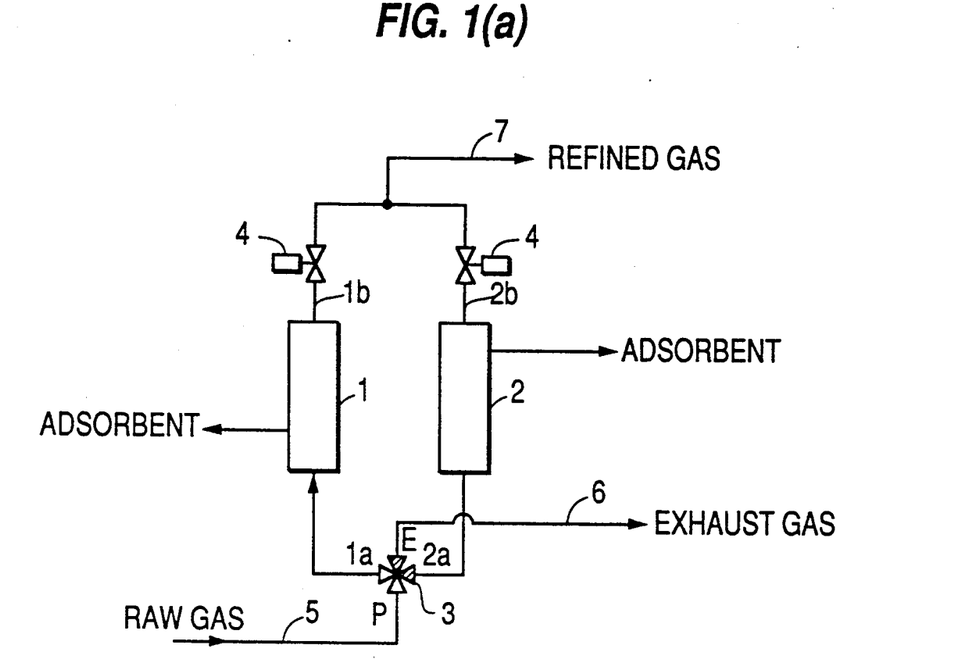
FIGS. 1(a) and 1(b) are system diagrams of one preferred embodiment of the present invention, in which different states of a switching valve are shown, respectively.
Figure 1B:
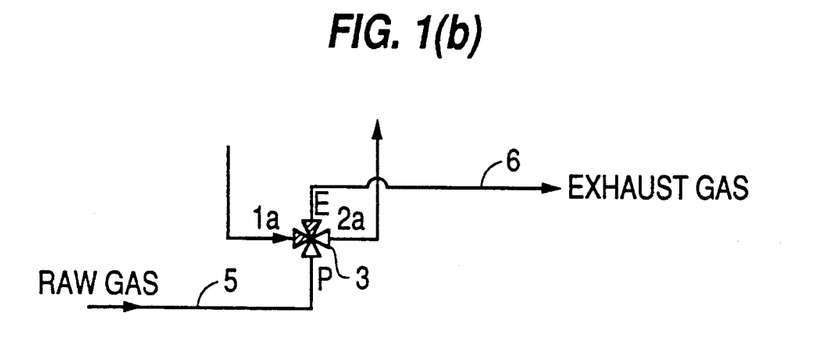

Now one preferred embodiment of the present invention will be described with reference to FIGS. 1 to 6. The pressure-swing type gas separator system comprises two adsorption vessels 1 and 2 respectively containing adsorbent as shown in FIG. 1. As will be described in detail in the following, adsorption is effected in one of the adsorption vessels while desorption is effected in the other adsorption vessel, and such steps are sequentially and alternately repeated.

The bottom portion of the adsorption vessel 1 is connected to a rotary type switching valve 3 which consists of a four-port rotary valve. Exhaust lines 1b and 2b are respectively connected to the top portions of the adsorption vessels 1 and 2. Stop valves 4 are connected to the exhaust lines 1b and 2b and to a common refined gas line 7.

Figure 2:
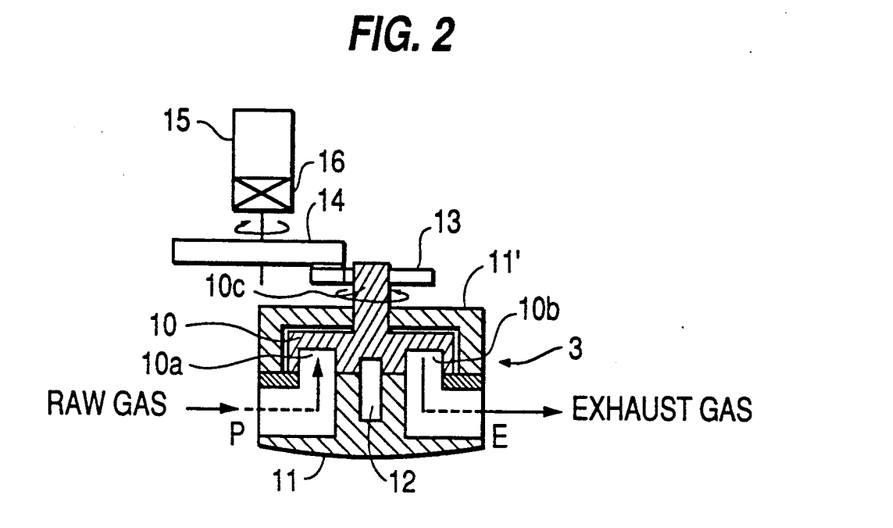
FIG. 2 is a schematic diagram, partially in section, of a drive mechanism for the switching valve of the same preferred embodiment.

As shown in FIG. 2, the rotary type switching valve 3 comprises a fixed valve body 11 having a circular cross section, a rotor in the form of a disc 10 rotatable about the center axis of the same valve body 11 via a rotary center pin 12, and a top cover 11' covering the disc 10 and fixed to the valve body 11.

Figure 4:
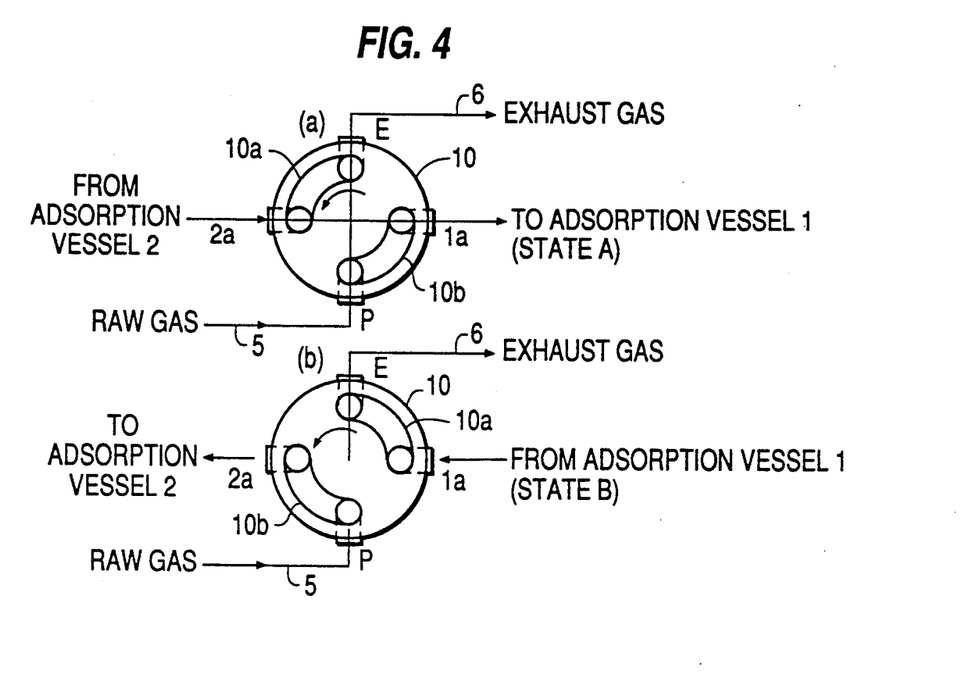
FIGS. 4(a) and 4(b) are schematic diagrams of the switching valve of the same preferred embodiment, in which different states of the switching valve are shown, respectively.

As shown in FIGS. 2 and 4, the valve body 11 is provided with four ports P, 1a, E and 2a each having an L-shaped cross section, and which open at its circumferential surface at equal intervals, that is, at positions angularly spaced by 90° about the rotary center pin 12. The ports extend radially inwards within the valve body 11 and open at the top of the valve body 11. On the other hand, the disc 10 is provided with two circular-arc-shaped slots 10a and 10b extending over an angular range of 90° about the rotary center pin 12 and disposed to opposite side of the rotary center pin 12 so that they can place the openings at the top of the valve body 11 in communication with adjacent ones of the above-described ports P, 1a, E and 2a.

The openings in the circumferential surface of the valve body 11 of the ports P, 1a, E and 2a are connected, respectively, to a raw gas line 5 maintained under a pressurized condition, to the bottom of the adsorption vessel 1, to an exhaust gas line 6 maintained under a reduced-pressure condition, and to the bottom of the adsorption vessel 2.

In addition, as shown in FIG. 2, a shaft 10c extends upwards from the center of disc 10 through the top cover 11'. To the upper portion of the shaft 10c is mounted a Geneva gear 13. This Geneva gear 13 meshes with a Geneva gear 14 which is rotationally driven by a motor 15 rotating at a constant speed via speed reduction gears 16.

Figure 3:
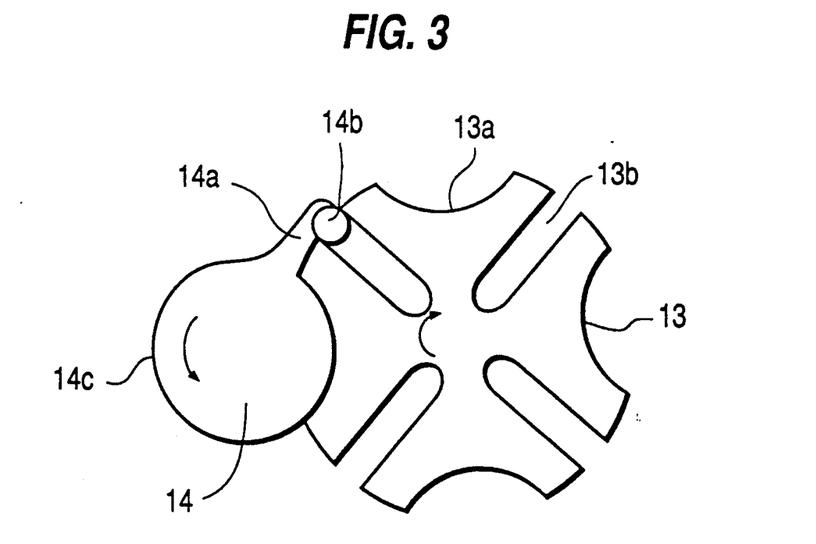
FIG. 3 is a schematic diagram of Geneva gears of the same preferred embodiment.

As shown in FIG. 3, the Geneva gear 13 is provided with four recesses 13a each having a circular-arc-shaped periphery and four grooves 13b extending in the radial direction and opening outwards at positions between adjacent ones of the recesses 13a. The Geneva gear 14 has a circular main body 14c and an arm 14a extending outwards. The lower surface of Geneva gear 14 is positioned a little above the upper surface of the Geneva gear 13, and an engaging portion 14b at the tip end of the arm 14a is adapted to engage Geneva gear 13 as sliding along the groove 13b of the Geneva gear 13. Accordingly, when the Geneva gear 14 is rotated in the direction of the arrow in FIG. 3 by the motor 15 via the speed reduction gears 16, during the first ¼ of a revolution of the Geneva gear 14, the engaging portion 14b of the arm 14a of the Geneva gear 14 engages the Geneva gear 13 within a groove 13b and rotates the Geneva gear 3 by 90° about its center axis. During the remaining ¾ of a revolution of the Geneva gear 14, the engaging portion 14b of the arm 14a is disengaged from the grooves 13b and the Geneva gear 13 does not rotate.

In the illustrated embodiment, the disc 10 of the switching valve 3 is rotated intermittently over angular intervals of 90° by the motor 15 via the Geneva gears 13 and 14. Accordingly, at a given time, the circular-arc-shaped grooves 10a and 10b take the state shown at in FIG. 4(a). Subsequently, they assume the state shown in FIG. 4(b). These states are sequentially and alternately repeated.

In the state shown in FIG. 4(a), the port P and the port 1a of the valve body 11 communicate with one another via the circular-arc-shaped groove 10b. Hence, the raw gas under a pressurized condition is introduced to the adsorption vessel 1 through the port P and the port 1a, and after an adsorptive component of the raw gas has been adsorbed by the adsorbent in the same vessel 1, refined gas is derived from the gas line 7 through the exhaust gas line 1b in which the stop valve 4 is opened. On the other hand, the port E and the port 2a in the valve body 11 communicate with one another via the circular-arc-shaped groove 10a. Hence, the inside of the adsorption vessel 2 is connected to the exhaust gas line 6 under a reduced-pressure condition. Thus, the pressure inside the adsorption vessel 2 is reduced, and the adsorbed gas is desorbed from the adsorbent and is exhausted to the exhaust gas line 6, whereby the adsorbent is regenerated. It is to be noted that at this time the stop valve 4 in the exhaust line 2b of the adsorption vessel 2 is kept closed.

To the contrary, in the state shown in FIG. 4(b), raw gas is introduced into the adsorption vessel 2 to obtain refined gas, and the adsorbent within the adsorption vessel 1 is regenerated.

Figure 6:
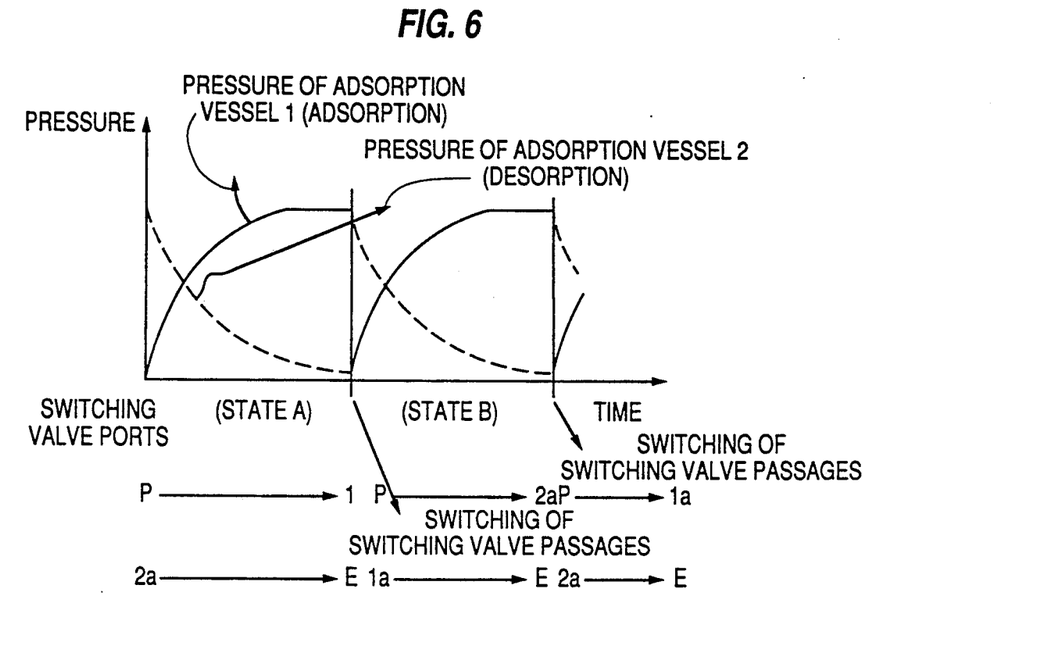
FIG. 6 is a diagram showing a relation between pressure swings in the respective adsorption vessels and states of valve ports of the switching valve.

FIG. 6 shows the swing in pressures in the respective adsorption vessels 1 and 2 during the connected states (FIGS. 4(a) and 4(b)) of the respective ports.

Figure 5:
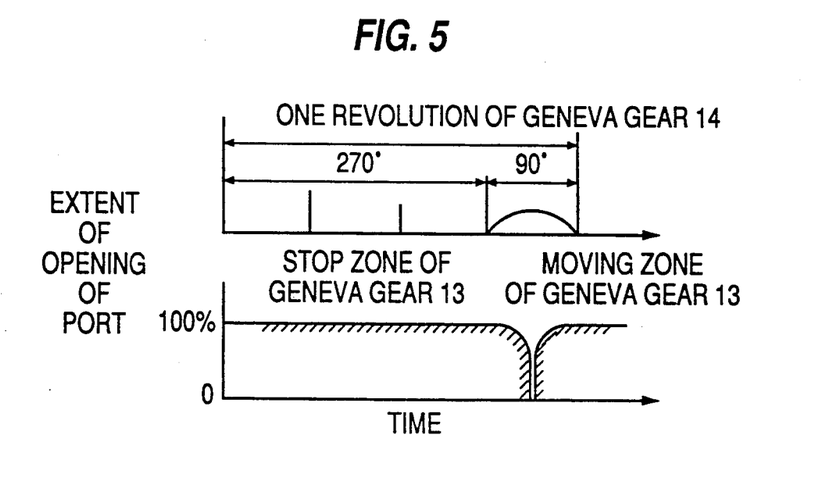
FIG. 5 is a diagram showing a relation between the state of Geneva gears and the extent to which a port of the switching valve is opened.

FIG. 5 shows a relation between the states (moving and stopped) of the Geneva gear 13 and the extent to which a respective port is opened to an exterior line.

As described above, in the illustrated embodiment, by intermittently rotating the disc 10 by the motor 15 via the speed reduction gears 16 and the Geneva gears 13 and 14, the adsorption vessels 1 and 2 can be selectively connected to the raw gas line 5 and the exhaust gas line 6 via the circular-arc-shaped grooves 10a and 10b in the disc 10. Hence, adsorptive gas components of the raw gas are adsorbed by the adsorbent within the adsorption vessels and adsorbed gases are desorbed from the adsorbent to regenerate the adsorbent.

Also, in the illustrated embodiment, because a disc 10 of the rotary type switching valve 3 switches the communicating states of the ports by being rotationally driven intermittently by the constant-speed motor 15 via the Geneva gears 13 and 14, the switching valve 3 can have a large bore diameter, a long life, and it does not require control air or the like. Furthermore, in this preferred embodiment, the time interval during which the valve is opened and closed can be easily preset.

Although the circumscribing type Geneva gears 13 and 14 have been described with respect to the above embodiment, inscribing type Geneva gears could be used as well. Alternatively, other intermittent transmission means such as a ratchet drive including a ratchet wheel and a pressure claw, an intermittent gearing in which some of the teeth of one of gears meshed with each other are missing, or the like could be employed.

The above-described embodiment of the present invention can achieve the following effects:
  (1) The directional switching valve can have a sufficiently large bore diameter adapted to a desired flow rate of raw gas.
  (2) Fewer switching valves can be employed as compared to the case in which pneumatically operated valves are used.
  (3) Since high-pressure air for operation is unnecessary, the system is simple.
  (4) The directional switching valve can easily carry out highly frequent opening/closing operations and the life of the valve is rather long.

Figure 8:
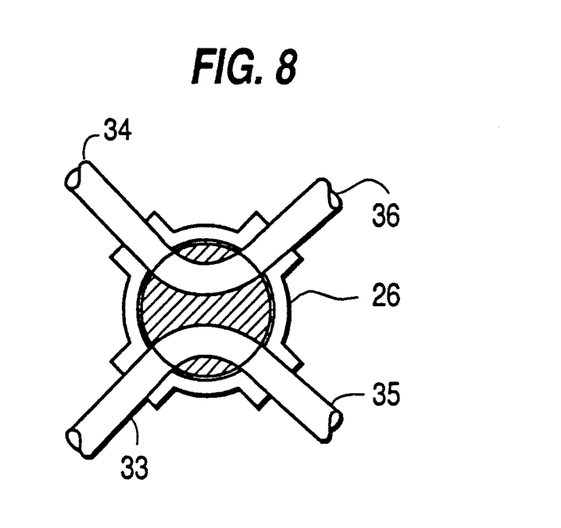
FIG. 8 is a cross-sectional view of a four-port rotary valve of the second preferred embodiment shown in FIG. 7.
Figure 9:
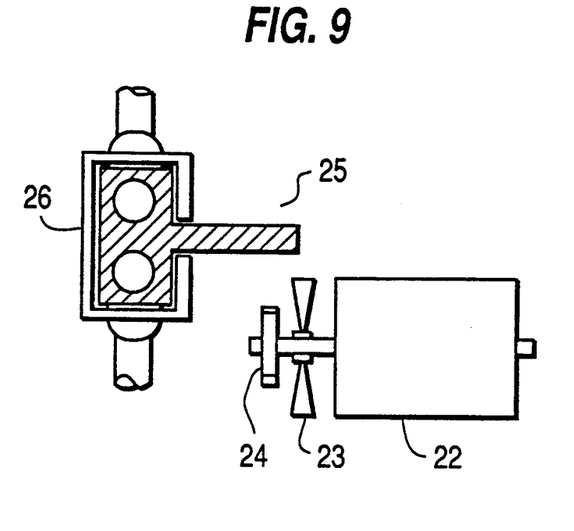
FIG. 9 is a schematic diagram, partially in section, of a motor for driving an air pump and the four-port rotary valve of the same preferred embodiment.

Next, another preferred embodiment of the present invention will be described with reference to FIGS. 7 to 9.

Air to be processed is introduced into an air pump 21 via an intake pipe 32, is then pressurized by pump 21, and is sent through a pump outlet pipe 33 into a four-port rotary valve 26. The four-port rotary valve 26 includes four openings and a rotor having a structure adapted to place two adjacent openings in communication with one another, as shown in FIG. 8. As shown in FIG. 9, a speed reduction gear 25 is mounted to the shaft of the motor 22 for driving the air pump 21. Since the driving torque of the motor 22 is transmitted to the four-port rotary valve 26 through the drive gear 24 meshing with the speed reduction gear 25, the air pump 21 and the four-port rotary valve 26 rotate as interlocked with each other. In other words, during the period when the air pump 21 is operating, the four-port rotary valve 26 is also always rotating. And by establishing a speed reduction ratio by appropriately selecting the numbers of teeth of the drive gear 24 and the speed reduction gear 25, the timing of the four-port rotary valve 26 is set depending upon a feed rate of air.

Figure 7:
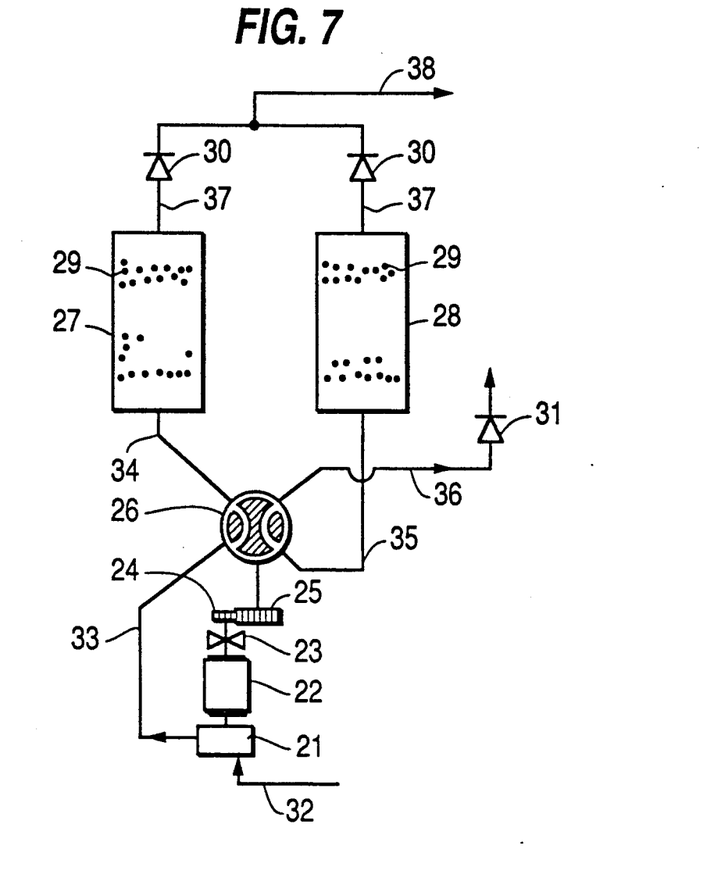
FIG. 7 is a schematic diagram of another preferred embodiment of a pressure-swing adsorption type air separator according to the present invention.

Under the condition shown in FIG. 7, the outlet pipe 33 of the air pump 21 is connected to a conduit 34 of an adsorption tower 27. Hence, air pressurized by the air pump 21 is introduced to the adsorption tower 27, nitrogen gas in the air is adsorbed by granular nitrogen adsorbent 29 within the tower 27, and a non-adsorptive component of oxygen gas flows from an outlet pipe 37 through a check valve 30 and is collected as condensed oxygen gas 38.

On the other hand, an adsorption tower 28 has its conduit 35 at the bottom thereof connected to a nitrogen gas exhaust pipe 36 via the four-port rotary valve 26, and further communicates via a check valve 31 with the outside of the system held at atmospheric pressure. Accordingly, nitrogen gas having been adsorbed by the nitrogen adsorbent 29 within the adsorption tower 28 is desorbed under a reduced pressure and is exhausted to the outside of the system. When a fixed amount of air has been fed to the adsorption tower 27 and a predetermined pressurized condition has been realized, the rotor of the four-port rotary valve 26 interlocked with the air pump 21 is rotated by 90°. Accordingly, the outlet pipe 33 of the air pump 21 is placed in communication with the conduit 35, and the conduit 34 of the adsorption tower 27 is placed in communication with the nitrogen gas exhaust pipe 36. Thus, the switching of the flow passages causes a pressurized adsorption process and a reduced pressure desorption-regeneration process to alternately be carried out in each of the adsorption towers.

As described above, by making use of the drive source for the air pump to simultaneously rotate the four-port rotary valve, flow passages of the adsorption towers can be switched depending upon the amount of air to be fed to the adsorption towers. Therefore, adsorption is performed regardless of variations in the output of the air pump caused by voltage variations or the like.

In addition, because the four-port rotary valve is interlocked with the drive source of the pump, the adsorption process is terminated after a predetermined amount of gas to be processes has been fed to the adsorption towers. Therefore, even if the feed rate of the gas to be processed should be reduced as a result of voltage variations, frequency variations or the like, the rotary speed of the four-port rotary valve is correspondingly reduced and thus the cycle time is prolonged. Accordingly, the pressure in the adsorption tower rises automatically until a predetermined pressure is established. Consequently, the non-adsorptive component of the product gas can be collected at a normal concentration. In addition, equipment such as a separate motor for driving the four-port rotary valve, a sequencer, a timer or a microcomputer for controlling the motor are not necessary. Therefore, the cost of the system is also relatively low.

Since many changes and modifications can be made to the above-described embodiments without departing from the spirit of the present invention, it is intended that all matter contained in the description and illustrated in the accompanying drawings be interpreted as illustrative of the invention and not in a limiting sense.

What is claimed is:

1. A pressure-swing adsorption gas separator system comprising: two adsorption vessels containing adsorbent; a source of raw gas; means for feeding raw gas from said source under pressure; an exhaust gas line maintained under a reduced pressure; a four-port rotary valve having four ports respectively associated with and connected to said adsorption vessels, said exhaust gas line, and said source of raw gas, and a rotary element rotatable to a first position at which one of said adsorption vessels is placed by the valve in communication with said raw gas source while the other of said adsorption vessels is placed by the valve in communication with the exhaust gas line via the ports of the valve connected thereto and to a second position at which said other of said adsorption vessels is placed by the valve in communication with said raw gas source while said one of the adsorption vessels is placed by the valve in communication with the exhaust gas line via the ports of the valve connected thereto; a rotary drive source which has a continuous rotary output when actuated; and an intermittent transmission which has an intermittent rotary output when a continuous rotary force is input thereto, said intermittent transmission being operatively coupled to said rotary drive source and to the rotor of said rotary valve so as to rotate said rotor intermittently so as to sequentially assume said first and said second positions thereof when said rotary drive source is actuated, whereby a pressurized adsorption process in which a component of the raw gas is adsorbed and a reduced pressure desorption process in which an adsorbed component of the raw gas is desorbed are alternately carried out in each of said adsorption vessels.

2. A pressure-swing adsorption gas separator system as claimed in claim 1, wherein said intermittent transmission comprises Geneva gears.

3. A pressure-swing adsorption gas separator system comprising: two adsorption vessels containing adsorbent; a source of raw gas; a pump disposed in-line between said source of raw gas and said adsorption vessels so as to feed raw gas under pressure toward said adsorption vessels; a drive motor operatively connected to said pump so as to drive said pump; an exhaust gas line maintained under a reduced pressure; a four-port rotary valve having four ports respectively associated with and connected to said adsorption vessels, said exhaust gas line, and said source of raw gas, and a rotary element rotatable to a first position at which one of said adsorption vessels is placed by the valve in communication with said raw gas source while the other of said adsorption vessels is placed by the valve in communication with the exhaust gas line via the ports of the valve connected thereto and to a second position at which said other of said adsorption vessels is placed by the valve in communication with said raw gas source while said one of the adsorption vessels is placed by the valve in communication with the exhaust gas line via the ports of the valve connected thereto; and a speed reducer connecting the rotor of said rotary valve to said drive motor, whereby a pressurized adsorption process in which a component of the raw gas is adsorbed and a reduced pressure desorption process in which an adsorbed component of the raw gas is desorbed are alternately carried out in each of said adsorption vessels.

4. A pressure-swing adsorption gas separator system as claimed in claim 3, wherein said speed reducer comprises speed-reduction gears.

* * * * *